(12) United States Patent
Saak et al.

(10) Patent No.: US 6,844,075 B1
(45) Date of Patent: Jan. 18, 2005

(54) ENVIRONMENTAL BARRIER COATING

(75) Inventors: Jennifer Su Saak, Clifton Park, NY (US); Peter Joel Meschter, Niskayuna, NY (US); David Joseph Mitchell, Niskayuna, NY (US); Krishan Lal Luthra, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/678,813

(22) Filed: Oct. 6, 2003

(51) Int. Cl.[7] .............................. B32B 9/04; F03B 3/12; C23C 16/06

(52) U.S. Cl. ........................ 428/446; 428/448; 428/697; 428/699; 428/701; 428/702; 427/255.19; 427/427; 416/241 B

(58) Field of Search ................................ 428/632, 697, 428/698, 699, 701, 702, 446, 448; 427/255.19, 421; 416/241 B

(56) References Cited

U.S. PATENT DOCUMENTS

| | | |
|---|---|---|
| 5,391,404 A | 2/1995 | Lee et al. |
| 5,496,644 A | 3/1996 | Lee et al. |
| 5,869,146 A | 2/1999 | McCluskey et al. |
| 5,985,470 A | 11/1999 | Spitsburg et al. |
| 6,129,954 A | 10/2000 | Spitsburg et al. |
| 6,254,935 B1 | 7/2001 | Eaton et al. |
| 6,284,325 B1 | 9/2001 | Eaton, Jr. et al. |
| 6,296,909 B1 | 10/2001 | Spitsburg et al. |
| 6,296,941 B1 | 10/2001 | Eaton, Jr. et al. |
| 6,296,942 B1 | 10/2001 | Eaton, Jr. et al. |
| 6,299,988 B1 | 10/2001 | Wang et al. |
| 6,312,763 B1 | 11/2001 | Eaton, Jr. et al. |
| 6,352,790 B1 | 3/2002 | Eaton et al. |
| 6,365,288 B1 | 4/2002 | Eaton et al. |
| 6,387,456 B1 | 5/2002 | Eaton, Jr. et al. |
| 6,410,148 B1 | 6/2002 | Eaton, Jr. et al. |
| 6,444,335 B1 | 9/2002 | Wang et al. |
| 6,485,848 B1 | 11/2002 | Wang et al. |
| 2002/0025454 A1 | 2/2002 | Wang et al. |
| 2002/0136835 A1 | 9/2002 | Li et al. |
| 2003/0003328 A1 | 1/2003 | Spitsburg et al. |
| 2003/0113552 A1 | 6/2003 | Sun et al. |
| 2003/0113553 A1 | 6/2003 | Sun et al. |
| 2003/0113559 A1 | 6/2003 | Eaton et al. |

FOREIGN PATENT DOCUMENTS

| | | |
|---|---|---|
| EP | 0 993 423 | 4/2000 |
| EP | 0 993 424 | 4/2000 |
| WO | WO 99/58472 | 11/1999 |
| WO | WO 00/64836 | 11/2000 |

*Primary Examiner*—Jennifer McNeil
(74) *Attorney, Agent, or Firm*—Paul J. DiConza; Patrick K. Patnode

(57) ABSTRACT

A coating for a silicon based material such as those used in high temperature environments. An aspect of the invention is directed to an environmental barrier coating including a silicon bond coat, and intermediate coat, and a top coat. The intermediate coat may comprise tantalum aluminate, niobium aluminate, or a mixture of the two. The intermediate coat is resistant to solid-state subsurface reactions with the bond coat and the top coat and is substantially inert to reactions with silica at high temperatures.

22 Claims, 7 Drawing Sheets

ENVIRONMENTAL BARRIER COATING

BACKGROUND OF THE INVENTION

This invention relates generally to barrier coatings, and more particularly to barrier coatings for use in high temperature, aqueous environments.

Ceramic materials containing silicon and alloys containing silicon have been proposed for structures used in high temperature applications, such as gas turbine engines, heat exchangers, internal combustion engines, and the like. These materials are particularly useful in gas turbine engines which operate at high temperatures in aqueous environments.

The desired lifetime for components in such turbine applications may be tens of thousands of hours at temperatures above 1000° C., for example. However, the components are known to experience significant surface recession under exposure to high-temperature, aqueous environments. Volatile silicon-based gaseous species form at temperatures over about 1000° C. which causes the surface of the components to recede. The rate of recession may be 0.254 mm (0.010 in) or greater per 1000 hours, for example, depending on combustion conditions such as temperature and water vapor concentration in the combustion gas. This rate is unacceptably high for many component lifetime requirements.

One proposed solution is a three layer environmental barrier coating as described in U.S. Pat. Nos. 6,387,456 and 6,410,148, which includes a silicon bond coat, a mullite and barium strontium aluminosilicate (BSAS) intermediate coat, and a pure BSAS top coat. However, after exposure to temperatures above about 1200° C. for long periods of time, the recession rate can be unacceptably high for extended component lifetime requirements. Furthermore, chemical reactions occur which result in consumption of the bond coat and the intermediate coat, which may further reduce the component lifetime below the desired level.

During service in high temperature environments, the silicon bond coat oxidizes, creating an interfacial layer of silica at the bond coat-intermediate coat interface. A solid-state subsurface reaction between this silica layer and the intermediate coat occurs. As the reaction between the silica layer and the intermediate coat proceeds, the oxidation of the silicon bond coat increases, eventually consuming the bond coat and the intermediate coat. The interfacial layer grows from the production of reaction products while the bond coat and intermediate coat recede. The reaction products of the silica and intermediate coat are typically unstable and promote poor adherence between the bond coat and the intermediate coat. The reaction products may be present in multiple phases and may possess other undesirable properties such as high thermal expansion mismatch with the bond coat and the intermediate coat.

Once the intermediate coat is consumed, further chemical reactions may occur between the top coat and any remaining bond coat, leading to further consumption of the bond coat. Once the bond coat is consumed, the substrate is oxidized, leading to gas bubble formation and often spatling of the entire environmental barrier coating. Absent the protection of the environmental barrier coating, the substrate is exposed, resulting in a high rate of recession of the substrate and curtailing component life.

These and other drawbacks are present in known systems and techniques.

BRIEF DESCRIPTION OF THE INVENTION

According to one embodiment, the invention relates to an article comprising a substrate comprising silicon, a bond coat on the substrate, the bond coat comprising silicon, an intermediate coat on the bond coat, the intermediate coat comprising at least one of tantalum aluminate and niobium aluminate, and a top coat on the intermediate coat.

According to another embodiment, the invention relates to a method of making an article comprising applying a bond coat comprising silicon to a substrate comprising silicon, applying an intermediate coat on the bond coat, the intermediate coat comprising at least one of tantalum aluminate and niobium aluminate, and applying a top coat on the intermediate coat.

The invention also relates, in one embodiment, to an article comprising a substrate comprising silicon, a bond coat on the substrate, the bond coat comprising silicon, an intermediate coat, a layer comprising silica between the bond coat and the intermediate coat, and a top coat on the intermediate coat, wherein the intermediate coat is capable of resisting a solid-state subsurface reaction between the intermediate coat and the silica.

DETAILED DESCRIPTION OF EXEMPLARY EMBODIMENTS

An exemplary embodiment of the invention is directed to an environmental barrier coating for a substrate comprising silicon, such as may be used as a component of a gas turbine engine, for example. When used in a high temperature environment, including high temperature aqueous environments, an intermediate coat of the environmental barrier coating between a bond coat and a top coat can reduce or prevent chemical reactions from occurring between chemical species in the bond coat and chemical species in the top coat. The intermediate coat may also resist solid state subsurface reaction with top coats, such as BSAS for example. The intermediate coat can further be substantially inert to the bond coat and/or to silica, which may form at a bond coat-intermediate coat interface. By high temperature environment is meant the temperature at which the silicon in the substrate forms gaseous Si—O and/or Si—O—H species, which may include temperatures above about 1000° C., for example. By aqueous environment is meant an environment including water, humid air, water vapor, combustion gases, and/or steam, for example.

Figure 1:
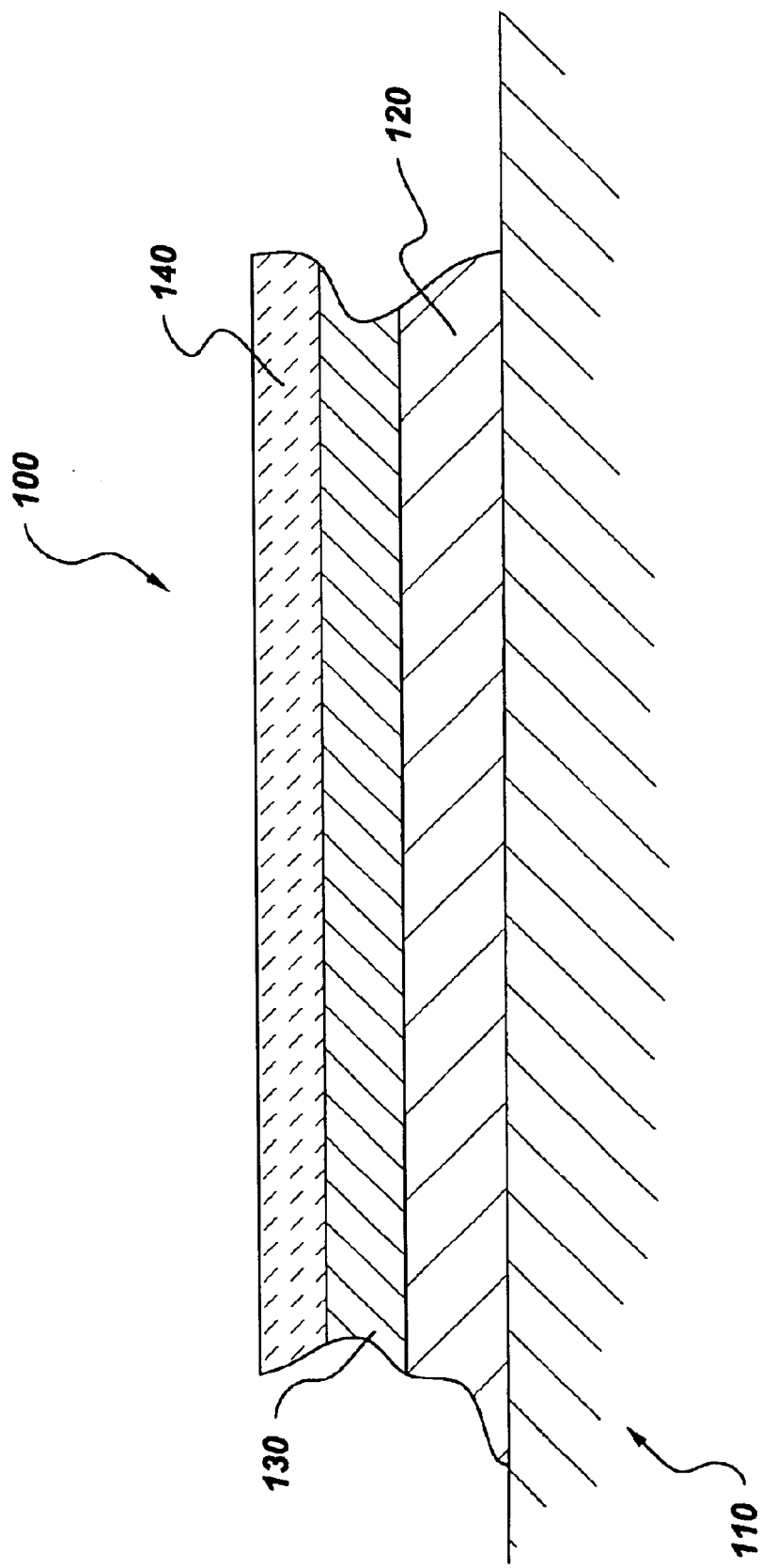
FIG. 1 is a cross-sectional view of an article in accordance with an exemplary embodiment of the invention.

According to one embodiment, the environmental barrier coating comprises three coats applied to a substrate comprising silicon as shown in the article of FIG. 1. A bond coat 120 comprising silicon is applied to the substrate 110. An intermediate coat 130 is applied to the bond coat 120. A top coat 140 is applied on the intermediate coat 130. Typically, the intermediate coat is formed as a single layer. However, if desired, the intermediate coat 130 can comprise multiple layers.

The substrate 110 may be any material comprising silicon, such as a ceramic or metal alloy, for example. In some exemplary embodiments, the substrate 110 may comprise a ceramic material, such as silicon carbide, silicon nitride, silicon carbon nitride, silicon oxynitride, and silicon aluminum oxynitride for example. In other exemplary embodiments, the substrate 110 may comprise a matrix with reinforcing materials such as fibers, particles, and the like, and more particularly, a matrix comprising silicon and/or silicon carbide which is fiber reinforced. Suitable ceramic substrates include a silicon carbide fiber-reinforced silicon carbide matrix, a carbon-fiber reinforced silicon carbide matrix, and a silicon carbide fiber-reinforced silicon nitride matrix, for example. Suitable silicon carbide fibers include polymer derived fibers that may also include nitrogen, boron, and oxygen in addition to silicon and carbon. The carbon to silicon ratio may be different from that in pure silicon carbide. Examples of polymer derived fibers include HI-NICALON and HI-NICALON S fibers from Nippon Carbon of Tokyo, Japan, and TYRANNO SA fibers available from UBE Industries of Tokyo, Japan, for example. Suitable silicon carbide fibers may also include silicon carbide monofilaments made by chemical vapor deposition (CVD) or fiber tows made by processing routes other than polymer processing, for example. Suitable silicon-metal alloy substrates include molybdenum-silicon alloys, niobium-silicon alloys and iron-silicon alloys, for example.

The substrate 110 may be coated with a bond coat 120 comprising silicon. According to one embodiment, the bond coat 120 comprises silicon metal applied to the substrate 110, typically at a thickness of about 0.0253 to about 0.506 mm (1 to 20 mils), and more typically from about 0.051 to about 0.152 mm (2 to 6 mils). Alternatively, the substrate 110 may be pre-oxidized to provide a silica ($SiO_2$) bond coat. The bond coat 120 can prevent oxidation of the underlying substrate and a corresponding release of gases, formation of gas bubbles, and spallation of the environmental barrier coating. The bond coat 120 can also provide improved adhesion of subsequently applied coats, such as the intermediate coat 130 and the top coat 140. The bond coat 120 can also decrease the risk that application of the intermediate coat 130 and the top coat 140 will damage the underlying substrate 110. The bond coat 120 can be applied to the substrate 110 by any known method of depositing a solid coating, such as by thermal spraying.

During operation, such as when the substrate is used as a component in a gas turbine engine, the silicon in the bond coat 120 will oxidize in the high temperature environment to form silica at the bond coat-intermediate coat interface. Alternatively, the bond coat 120 may itself be silica or a layer of silica may be applied between the bond coat 120 and the intermediate coat 130.

Preferably, the intermediate coat 130 is resistant to solid-state subsurface reactions with the bond coat 120 and/or the silica. The intermediate coat 130 may also be resistant to solid-state subsurface reactions with the top coat 140. The intermediate coat 130 is preferably substantially inert with silica even at temperatures in excess of 1000° C. In an exemplary embodiment of the invention, the intermediate coat of the environmental barrier coating comprises tantalum aluminate ($TaAlO_4$), niobium aluminate ($NbAlO_4$), or mixtures of the two. The intermediate coat can prevent chemical species originating in the top coat from reacting with chemical species originating in the bond coat.

Starting materials for creating an intermediate coat 130 in accordance with an exemplary embodiment of the invention comprise a mixture of (a) alumina and (b) tantalum oxide, niobium oxide, or a mixture of tantalum oxide and niobium oxide. When these materials are mixed, the tantalum oxide and/or niobium oxide and alumina react to form a binary or ternary aluminate compound. When mixed in stoichiometric proportions, the starting materials may react completely to form a composition for use as an intermediate coat 130 that consists essentially of tantalum aluminate and/or niobium aluminate. For example, starting materials of 50 mol % $Ta_2O_5$ and 50 mol % $Al_2O_3$ may yield a product of nearly 100 mol % $TaAlO_4$.

Although stoichiometric proportions are preferred, starting materials may deviate from these proportions, and may include excess niobium or tantalum oxide, or excess alumina which may remain in the composition for use as the intermediate coat 130. If excess niobium or tantalum oxide, or excess alumina, is used, such excess is preferably limited so that the end product is about 95 to 99.9 mol % tantalum aluminate or niobium aluminate, or a mixture of the two, while any excess niobium or tantalum oxide or alumina is present from about 0.1 to about 5 mol %. The resulting composition may then be applied as an intermediate coat 130 on the substrate 110. Preferably, the intermediate coat 130 is applied on the substrate 110 between a bond coat 120 comprising silicon which is first applied to the substrate 110, and a top coat 140 applied to the intermediate coat 130.

The top coat 140 may be any coating which is capable of adhering to the intermediate coat 130. The top coat 140 typically has a coefficient of thermal expansion within about 20% of that of the intermediate coat 130, for example, and typically has higher volatilization resistance than the intermediate coat 130. One suitable top coat is BSAS, for example.

The coats 120, 130, 140 may be applied to the substrate by any known method of depositing a solid coating. A preferred method of application is by thermal spraying.

The substrate 110 comprising silicon is preferably cleaned prior to application of any coat to remove any contamination remaining from substrate fabrication. The substrate 110 can be cleaned by grit-blasting, for example. The grit particle is preferably hard enough to remove undesired contamination and roughen the surface of the substrate 110. The grit particle size is preferably small enough to prevent impact damage to the substrate. One example of a method of grit blasting utilizes alumina particles having a particle size of less than or equal to 30 microns at a velocity of about 150 to about 200 m/sec.

If a bond coat 120 of silicon metal is applied to the substrate 110, the silicon may be applied directly to the grit blasted surface of the substrate 110, for example by thermal spraying on the substrate 110 when the substrate 110 is at a temperature of about 200 to about 300° C. The bond coat 120 can be applied as a thin layer while still completely covering the substrate 110 to avoid any bare spots. Typically, the bond coat 120 has a thickness of between about 0.0253 and about 0.506 mm (1–20 mils), preferably between about 0.051 to about 0.152 mm (2 to 6 mils).

The intermediate coat 130 and the top coat 140 may be applied by thermal spraying at a substrate temperature of between about 100 to about 400° C., for example. These coats may be sprayed to a thickness greater than about 0.013 mm (0.5 mils), preferably between about 0.076 to about 0.76 mm (3 to 30 mils) and more preferably between about 0.076 to about 0.127 mm (3 to 5 mils).

Following thermal spraying, the article may be heat treated to crystallize and/or chemically equilibrate phases in the applied coats, to provide stress relief in the thermal sprayed article and to promote bonding between coats. Generally, this heat treatment involves controlled heating of the article over time.

EXAMPLE

Sintered pellets of compositions corresponding to an intermediate coat having a composition in accordance with one aspect of the present invention (tantalum aluminate) and an intermediate coat having a conventional composition (barium strontium aluminosilicate or BSAS) were prepared and tested. These pellets were coated with silicon, such as may be found in an exemplary bond coat, and then exposed to an oxidative high temperature environment as might be experienced in a gas turbine engine, for example. The interface of the pellet and the silicon coating, corresponding to an interface of an intermediate coat and a bond coat, was then analyzed for each of the two pellet compositions.

Tantalum aluminate was prepared from a starting powder mixture of 50 mol % $Ta_2O_5$ and 50 mol % $Al_2O_3$. Both powders were 99.99% pure and had a −325 mesh particle size. The powders were obtained from Cerac, Inc. of Milwaukee, Wis. The $Al_2O_3$ and $Ta_2O_5$ powders were mixed with ethanol and zirconia milling media in a polyethylene bottle and ball-milled for about 12 hours. The mixture was dried at 90° C. and sieved through a 100 mesh screen. The sieved powders were cold pressed into pellets under $2.76 \times 10^4$ kPa (4 kpsi) in a 22.23 mm (⅞ in) diameter die. The pellets were isostatically pressed at $2.01 \times 10^5$ kPA (30 kpsi) in latex tubing and then sintered for 2 hours at 1650° C. in air. X-ray diffraction of the pellets showed the presence of $TaAlO_4$.

BSAS pellets were produced in a similar manner from commercially available BSAS powder from H. C. Starck, Inc. of Newton, Mass. The powder was cold pressed and isostatically pressed into pellets. The BSAS pellets were sintered for 2 hours at 1600° C. in air. X-ray diffraction of the pellet showed the presence of celsian BSAS.

Figure 2:
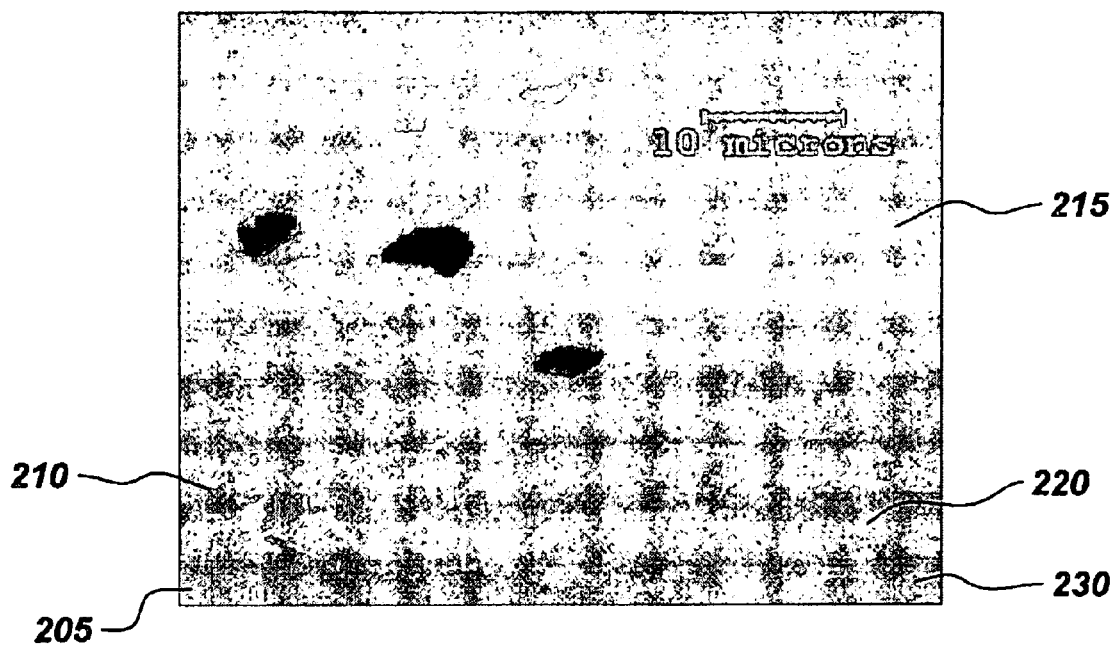
FIG. 2 is a micrograph of a bond coat-intermediate coat interface using a BSAS intermediate coat.
Figure 3:
FIG. 3 is a micrograph of a bond coat-intermediate coat interface in accordance with an exemplary embodiment of the invention.

The surface of both the tantalum aluminate and the BSAS sintered pellets was roughened by grit blasting with 36 grit SiC media. The surfaces were then ultrasonically cleaned in alcohol. A silicon coating was air plasma sprayed on one face of each of the tantalum aluminate and BSAS pellets. The silicon coated pellets were then exposed to a temperature of 1315° C. for about 500 hours in air, creating a high temperature oxidizing environment such as may be experienced in a gas turbine engine, for example. After this exposure, an interfacial layer was found to be present between the pellet and the silicon coating for both the tantalum aluminate and the BSAS samples. These interfacial layers were further analyzed to identify their compositions. As shown in the scanning electron micrograph in FIG. 2, the interfacial layer 210 between the BSAS pellet and the silicon coating is about 10 micrometers (μm) in width, approximately an order of magnitude thicker than the interfacial layer 310, which is about 1 μm in width, between the tantalum aluminate pellet and the silicon coating shown in the scanning electron micrograph of FIG. 3. Further, the interfacial layer 210 between the BSAS pellet and the silicon coating shown in FIG. 2 shows two regions, a light area 220 and a dark area 230. The thickness of the interfacial layer 310 on the tantalum aluminate sample is comparable to the thickness of a silica layer which would be expected based on a growth rate of pure silica on silicon under air oxidizing conditions, indicating a lack of any subsurface reactions between the tantalum aluminate and the silica.

The significantly thicker interfacial layer 210 on the BSAS pellet indicates a significant rate of interaction between the BSAS and the silica layer grown on the silicon. This subsurface interaction leads to more rapid consumption of the silicon bondcoat than in the case of the pure silica layer 310 grown on silicon in contact with the tantalum aluminate pellet.

Figure 4:
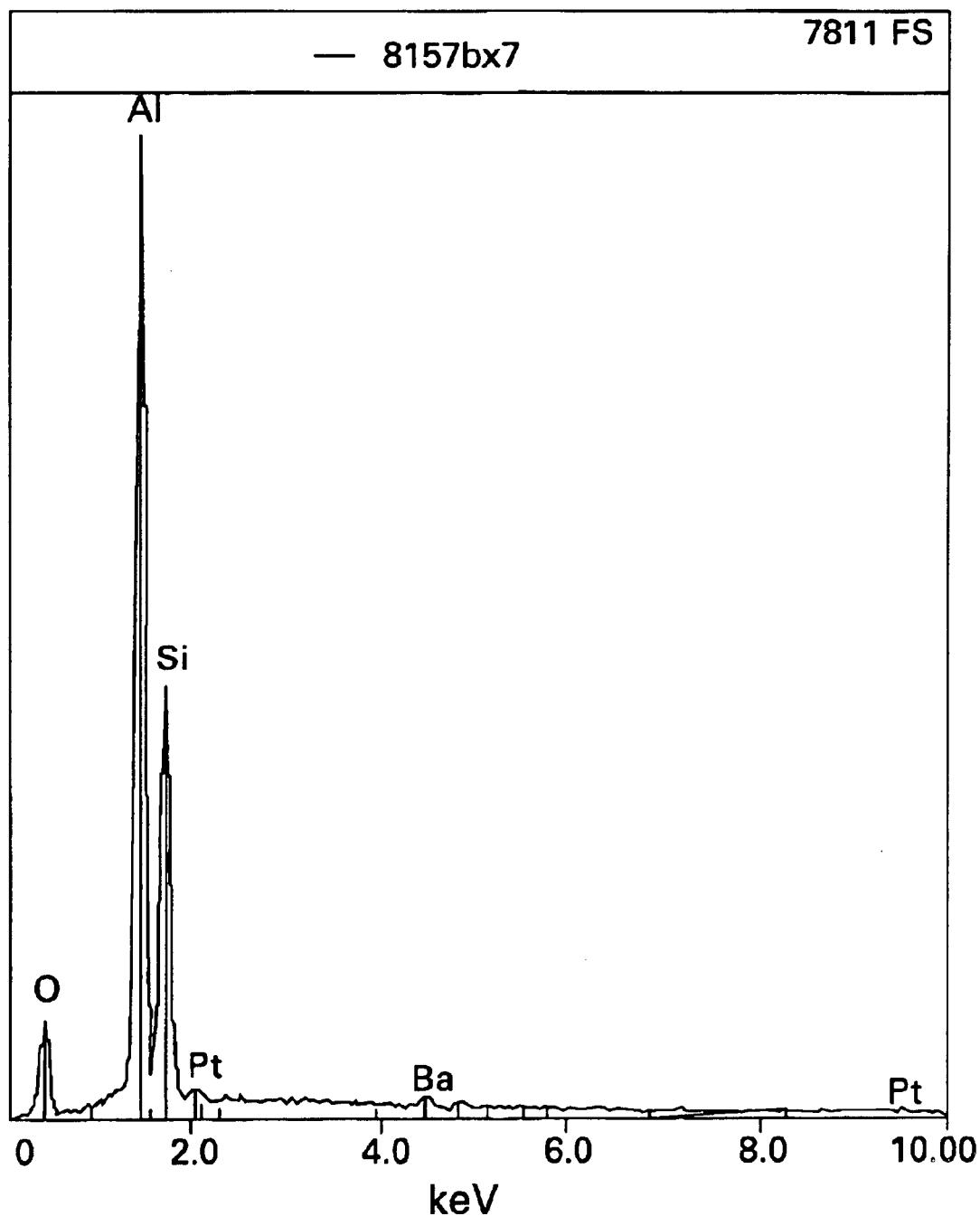
FIG. 4 is an energy dispersive x-ray spectrum of a composition taken from one region of a bond coat-intermediate coat interfacial layer using a BSAS intermediate coat.
Figure 5:
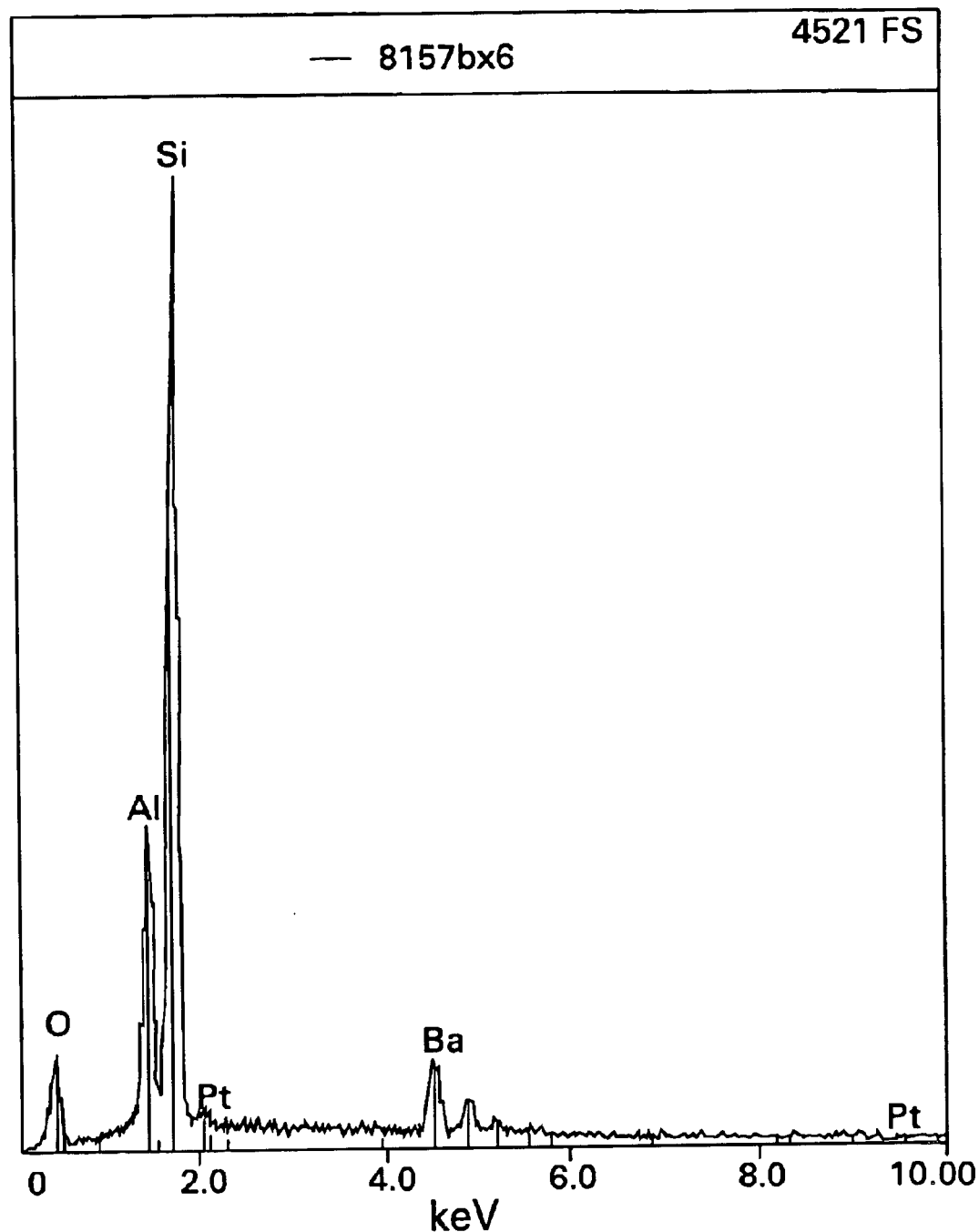
FIG. 5 is an energy dispersive x-ray spectrum of a composition taken from a different region of a bond coat-intermediate coat interfacial layer using a BSAS intermediate coat.
Figure 6:
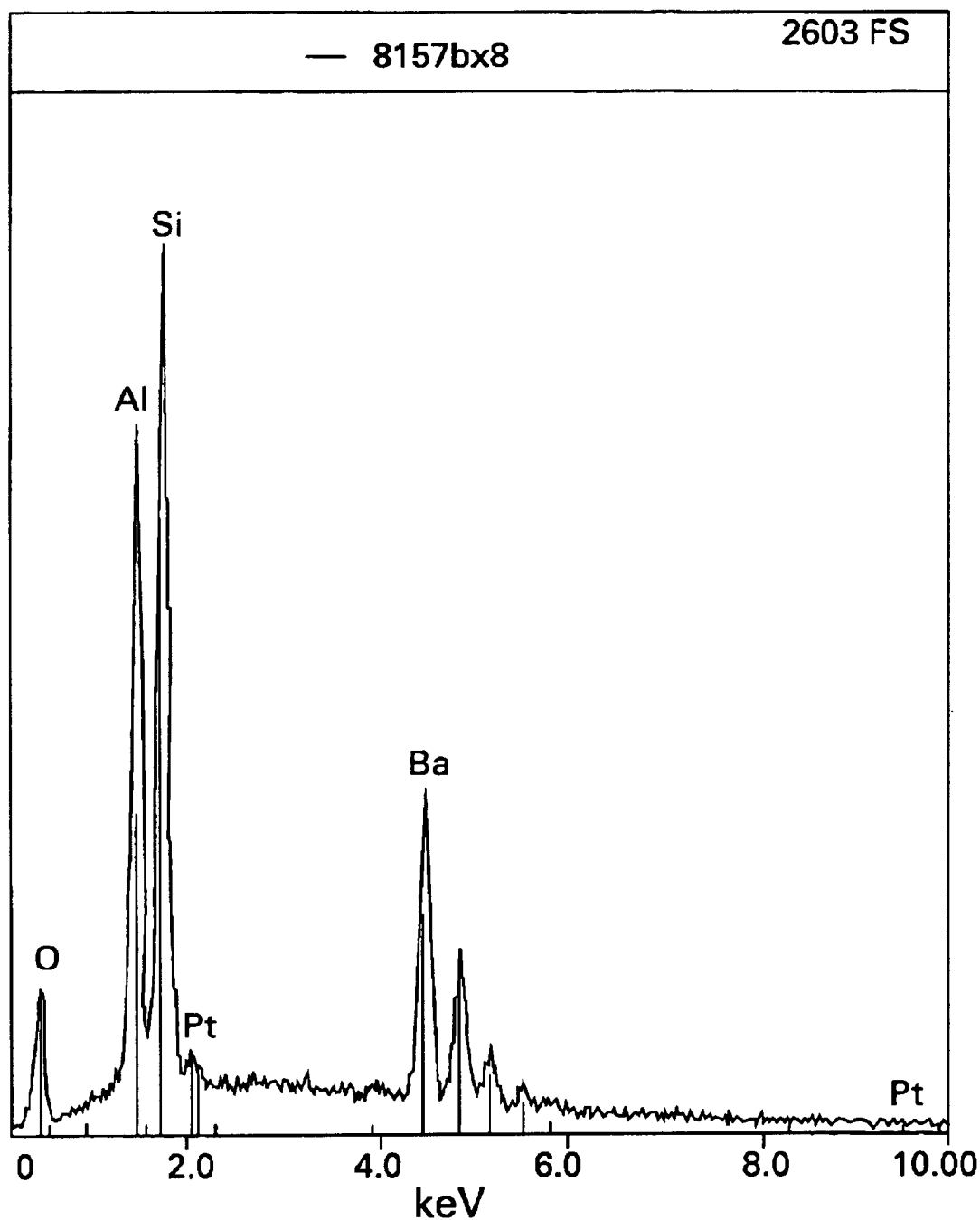
FIG. 6 is an energy dispersive x-ray spectrum of a composition of a BSAS intermediate coat.

FIGS. 4 and 5 are energy dispersive x-ray patterns obtained from each of these two phases of the interfacial layer of the BSAS sample. The x-ray spectra show the relative intensities of x-ray emission of various elements when exposed to an electron beam. Intensity, shown on the y-axis, varies with the atomic percentage of a given element. The figures reveal that the two phases of the interfacial layer from the BSAS sample have different compositions than the starting BSAS. FIG. 4 shows the spectrum for the lighter phase 220 of the interfacial layer and shows this phase contained a larger percentage of silicon than the initial BSAS phase pattern shown in FIG. 6. FIG. 5 shows the dispersive x-ray pattern for the darker phase 230 of the interfacial layer and shows the darker phase contained a composition with a very large percentage of aluminum and lower amounts of silicon compared to the initial BSAS phase. The substantial change in the silicon to aluminum ratio in both regions of the interfacial layer 210 demonstrates the occurrence of solid state chemical reactions between the BSAS pellet and the silica product of subsurface silicon oxidation.

Figure 7:
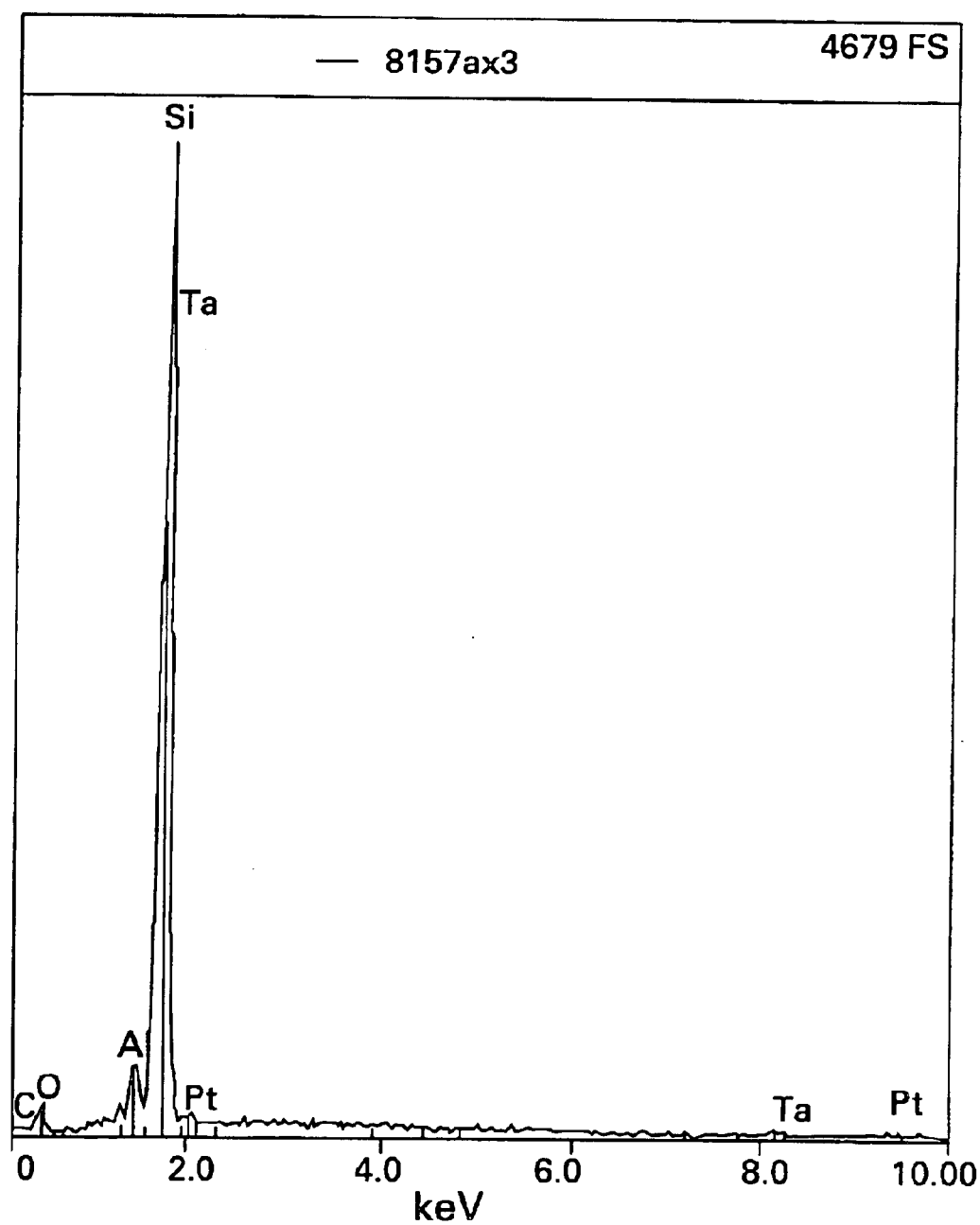
FIG. 7 is an energy dispersive x-ray spectrum of a composition taken from a bond coat-intermediate coat interfacial layer using an intermediate coat in accordance with an exemplary embodiment of the invention.
Figure 8:
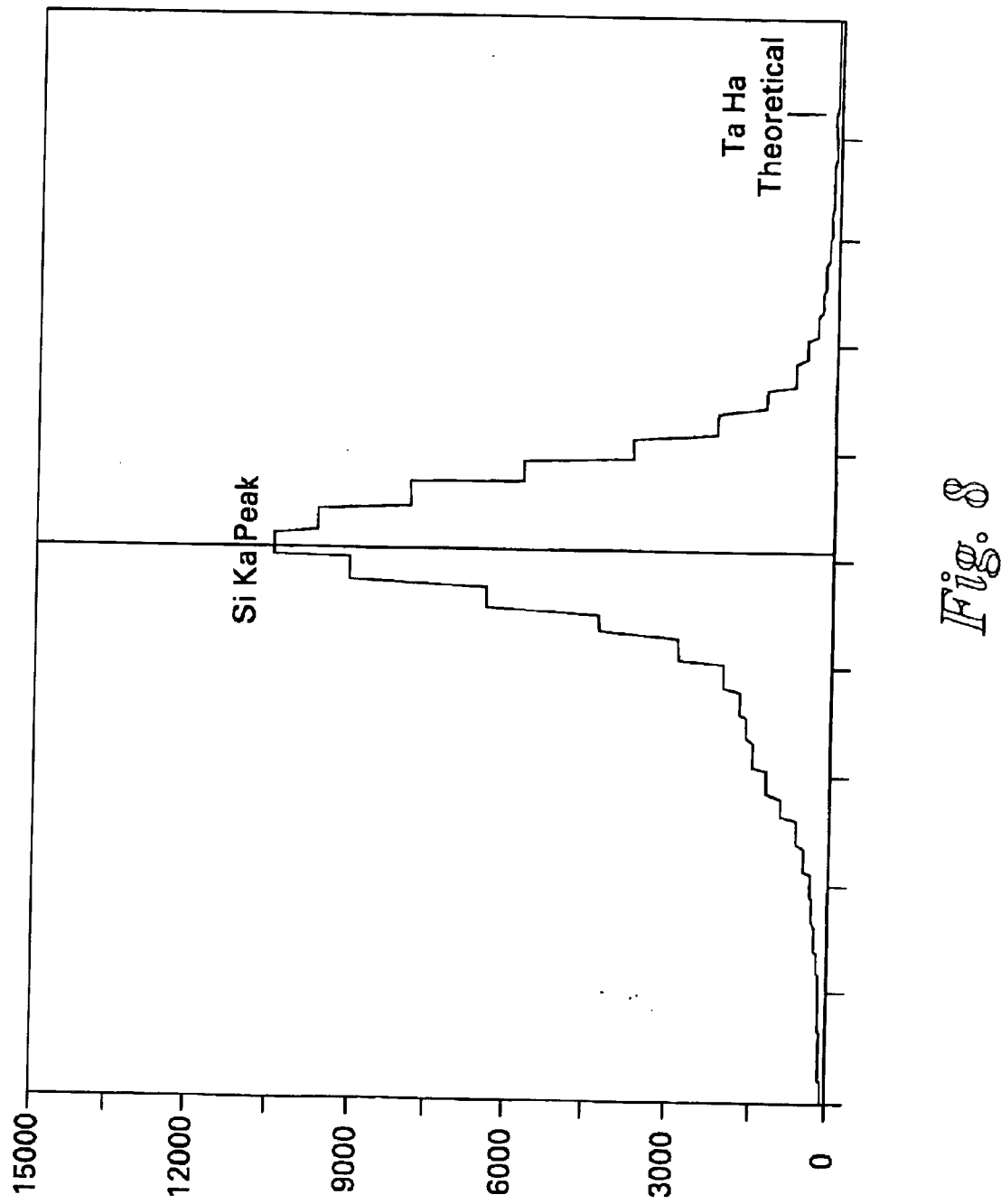
FIG. 8 is a wavelength dispersive spectroscopy pattern of a bond coat-intermediate coat interfacial layer using an intermediate coat in accordance with an exemplary embodiment of the invention.

Energy dispersive x-ray analysis conducted on the interfacial layer of the tantalum aluminate pellet, as shown in the spectrum of FIG. 7, indicates the interfacial layer contains mostly silicon, with little tantalum oxide or alumina. FIG. 7 shows a negligible tantalum peak at about 8 keV, indicating only a trace presence of tantalum in the interfacial layer. Because tantalum has a second energy peak which overlaps a silicon energy peak at about 2 keV, quantitative compositional analysis was conducted in an electron microprobe by wavelength dispersive spectroscopy to further analyze the composition of the interfacial layer. The results of this additional analysis are shown graphically in FIG. 8. This further analysis demonstrated the interfacial layer contained approximately 35 at % silicon, 0.25 at % aluminum, and 0.06 at % tantalum. This level of tantalum is below the noise level (0.1 at %) of the analysis. These results demonstrate that little to no reaction occurred in the interfacial layer between the tantalum aluminate pellet and the silica which resulted from the oxidation of the silicon.

The thicknesses and compositions of the interfacial layers in the BSAS sample compared to the tantalum aluminate sample indicate that a substantial subsurface chemical reaction occurred between the BSAS pellet and the silica. This reaction did not take place to any appreciable extent in the tantalum aluminate sample demonstrating that the BSAS was less effective at preventing degradation of a silicon bond coat than the tantalum aluminate sample.

While the foregoing specification illustrates and describes exemplary embodiments of this invention, it is to be understood that the invention is not limited to the construction disclosed herein. The invention can be embodied in other specific forms without departing from the spirit or essential attributes. Accordingly, reference should be made to the following claims, rather than to the foregoing specification, as indicating the scope of the invention.

What is claimed is:

1. An article comprising
  a substrate comprising silicon;
  a bond coat on the substrate, the bond coat comprising silicon;
  an intermediate coat on the bond coat, the intermediate coat comprising at least one of tantalum aluminate and niobium aluminate; and
  a top coat on the intermediate coat.

2. The article of claim 1, wherein at least one of tantalum aluminate and niobium aluminate comprises about 95 to about 100 mol % of the intermediate coat.

3. The article of claim 1, wherein the intermediate coat further comprises alumina.

4. The article of claim 3, wherein the alumina is present from about 0.1 to about 5 mol %.

5. The article of claim 1, wherein the intermediate coat further comprises at least one of tantalum oxide and niobium oxide.

6. The article of claim 5, wherein at least one of tantalum oxide and niobium oxide is present in about 0.1 to about 5 mol %.

7. The article of claim 1, wherein the intermediate coat consists essentially of at least one of tantalum aluminate and niobium aluminate.

8. The article of claim 1, wherein the intermediate coat is substantially inert to $SiO_2$ at temperatures greater than 1000° C.

9. The article of claim 1, wherein the coefficient of thermal expansion of the intermediate coat is within about twenty percent of the coefficient of thermal expansion of the top coat.

10. The article of claim 1, wherein the top coat comprises barium strontium aluminosilicate.

11. The article of claim 1, wherein the substrate comprises at least one of silicon carbide and silicon nitride.

12. The article of claim 11, wherein the substrate comprises at least one of silicon carbide and silicon nitride dispersed in a matrix material.

13. The article of claim 1, wherein the substrate comprises a silicon carbide matrix.

14. The article of claim 1, wherein the substrate comprises a silicon carbide reinforcement in a silicon carbide matrix.

15. The article of claim 1, wherein the substrate comprises a silicon carbide reinforcement in a silicon/silicon carbide matrix.

16. The article of claim 1, wherein the article is a component of a gas turbine engine.

17. The article of claim 1, further comprising a layer of silica between the bond coat and the intermediate coat.

18. A method of making an article comprising
  applying a bond coat comprising silicon to a substrate comprising silicon;
  applying an intermediate coat on the bond coat, the intermediate coat comprising at least one of tantalum aluminate and niobium aluminate; and
  applying a top coat on the intermediate coat.

19. The method of claim 18, wherein the intermediate coat is applied by thermal spraying.

20. The method of claim 18, wherein the intermediate coat consists essentially of at least one of tantalum aluminate or niobium aluminate.

21. The method of claim 18, wherein the top coat comprises barium strontium aluminosilicate.

22. The method of claim 18, furthercomprising applying a layer of silica between the bond coat and the intermediate coat.

* * * * *